United States Patent
Kaaha (10) Patent No.: US 10,504,049 B1
(45) Date of Patent: Dec. 10, 2019

(54) METHOD AND SYSTEM FOR INTEGRATING BUSINESS AND FITNESS TASKS

(71) Applicant: Diana Kaaha, Saratoga, CA (US)

(72) Inventor: Diana Kaaha, Saratoga, CA (US)

(73) Assignee: Intuit Inc., Mountain View, CA (US)

( * ) Notice: Subject to any disclaimer, the term of this patent is extended or adjusted under 35 U.S.C. 154(b) by 1168 days.

(21) Appl. No.: 14/812,850

(22) Filed: Jul. 29, 2015

(51) Int. Cl.
*G06Q 10/06* (2012.01)
*G09B 5/06* (2006.01)

(52) U.S. Cl.
CPC .......... *G06Q 10/0633* (2013.01); *G09B 5/06* (2013.01)

(58) Field of Classification Search
None
See application file for complete search history.

(56) References Cited

U.S. PATENT DOCUMENTS

| | | | | |
|---|---|---|---|---|
| 7,774,324 B1 * | 8/2010 | Henderson | ............. | G06Q 10/06 707/701 |
| 8,280,822 B2 * | 10/2012 | McKeown | ........... | G06Q 10/067 705/320 |
| 8,475,367 B1 * | 7/2013 | Yuen | ................... | G06F 19/3418 600/300 |
| 2006/0020509 A1 * | 1/2006 | Strain | .................. | G06Q 10/109 705/14.25 |
| 2007/0100595 A1 * | 5/2007 | Earles | .................... | G06Q 30/02 703/13 |
| 2007/0276203 A1 * | 11/2007 | Day | .................... | G06F 19/3418 600/301 |
| 2008/0055154 A1 * | 3/2008 | Martucci | ............... | G01S 5/0027 342/357.55 |

(Continued)

FOREIGN PATENT DOCUMENTS

| | | | | | |
|---|---|---|---|---|---|
| EP | | 2606942 A1 * | 6/2013 | ............. | H04L 67/18 |
| WO | WO-2007001886 A2 * | | 1/2007 | ......... | G06F 19/3418 |

OTHER PUBLICATIONS

Giddens, Laurie, Ester Gonzalez, and Dorothy Leidner. "I track, therefore I am: exploring the impact of wearable fitness devices on employee identity and well-being." (2016). (Year: 2016).*

(Continued)

*Primary Examiner* — Thomas L Mansfield
*Assistant Examiner* — Derick J Holzmacher
(74) *Attorney, Agent, or Firm* — Ferguson Braswell Fraser Kubasta PC (57) ABSTRACT

In general, embodiments of the invention provide a method, a system, and a computer readable medium for integrating business and fitness tasks and providing a plan of some type to users in some manner. The tasks may include fitness data collected by fitness tools. The tasks may further include business data collected by business tools. Embodiments of the invention analyze the fitness data and the business data of the user to produce a plan. The plan may include recommendations and/or insights regarding any pending and/or completed tasks of the user. The plan may further include notifications and results. The notifications may also include recommendations and/or insights regarding any pending and/or completed tasks and/or results that may be presented to the user. The notifications and/or results may include vocal, audible, graphical, tabular, and/or textual data describing the user's activity.

21 Claims, 7 Drawing Sheets

(56) References Cited

U.S. PATENT DOCUMENTS

| | | | | |
|---|---|---|---|---|
| 2010/0100427 A1* | 4/2010 | McKeown | ............ | G06Q 10/067 705/322 |
| 2010/0121716 A1* | 5/2010 | Golan | .................... | G01S 5/0027 705/14.58 |
| 2010/0198757 A1* | 8/2010 | Cheng | .................... | G06Q 10/10 706/12 |
| 2012/0271883 A1* | 10/2012 | Montoya | ............... | H04W 4/023 709/204 |
| 2012/0323811 A1* | 12/2012 | McKeown | ............ | G06Q 10/067 705/320 |
| 2013/0006883 A1* | 1/2013 | McKeown | ............ | G06Q 10/067 705/320 |
| 2013/0013327 A1* | 1/2013 | Horseman | ............ | G06F 19/3418 705/1.1 |
| 2013/0018689 A1* | 1/2013 | Guicciardi | ......... | G06Q 10/0639 705/7.15 |
| 2013/0041590 A1* | 2/2013 | Burich | ................. | G06F 19/3418 702/19 |
| 2013/0156308 A1* | 6/2013 | Abe | ..................... | G06K 9/4652 382/165 |
| 2013/0166048 A1* | 6/2013 | Werner | ................... | H04L 67/18 700/91 |
| 2013/0226641 A1* | 8/2013 | Chory | ................ | G06Q 10/0631 705/7.15 |
| 2013/0325394 A1* | 12/2013 | Yuen | ..................... | H04W 4/023 702/150 |
| 2013/0339099 A1* | 12/2013 | Aidroos | ................. | G06Q 50/01 705/7.36 |
| 2014/0214443 A1* | 7/2014 | Duffy | .................. | G06F 19/3418 705/2 |
| 2015/0142689 A1* | 5/2015 | Squires | .............. | G06Q 30/0279 705/329 |
| 2015/0220883 A1* | 8/2015 | B'Far | ................... | G06Q 10/105 700/91 |
| 2015/0262467 A1* | 9/2015 | Yuen | ..................... | A61B 5/1118 340/870.07 |
| 2015/0269848 A1* | 9/2015 | Yuen | ..................... | G09B 19/00 434/236 |
| 2015/0347939 A1* | 12/2015 | King | .................. | G06Q 10/0639 705/7.38 |
| 2015/0347977 A1* | 12/2015 | King | .................. | G06Q 10/1057 705/30 |
| 2016/0089572 A1* | 3/2016 | Liu | ..................... | G06K 9/00342 434/255 |

OTHER PUBLICATIONS

Hamper, Andreas. "A context aware mobile application for physical activity pronnotion." 2015 48th Hawaii International Conference on System Sciences. IEEE, 2015. (Year: 2015).*

Lingg, Elizabeth, et al. "Cardea: Cloud based employee health and wellness integrated wellness application with a wearable device and the HCM data store." 2014 IEEE World Forum on Internet of Things (WF-IoT). IEEE, 2014. (Year: 2014).*

* cited by examiner

METHOD AND SYSTEM FOR INTEGRATING BUSINESS AND FITNESS TASKS

BACKGROUND

In general, business owners and their employees strive to improve their health as well as their business efficiency. Business owners and their employees with insights and recommendations can make it easier to simultaneously improve their health and increase business productivity. These improvements result in healthier employees who produce better work output, are more efficient in the workplace, and require less time off due to illness. Healthier and more productive employees also improve the overall efficiency of the business, resulting in higher financial success and quality of life for all parties involved.

SUMMARY

In general, in one aspect, the invention relates to a method for providing notifications for a plurality of tasks to a user. The method includes obtaining fitness data collected by a plurality of fitness tools. The method may further include obtaining, from a controlled data source, business data collected by a plurality of business tools. The method may further include generating a first task of the plurality of tasks based on the fitness data, and a second task of the plurality of tasks based on the business data. The method may further include analyzing the first task and the second task to generate a plan using a predetermined benchmark. The method may further include presenting the plan to the user.

In general, in one aspect, the invention relates to a system that includes a task server configured to obtain fitness data collected by a plurality of fitness tools. The instructions may further include functionality for obtaining, from a controlled data source, business data collected by a plurality of business tools. The instructions may further include functionality for generating a first task of the plurality of tasks based on the fitness data, and a second task of the plurality of tasks based on the business data. The system may include an analysis engine configured to analyze the first task and the second task to generate a plan using a predetermined benchmark.

In general, in one aspect, the invention relates to a non-transitory computer readable medium storing instructions for providing notifications for a plurality of tasks to a user. The instructions, when executed by a computer processor, include functionality for obtaining fitness data collected by a plurality of fitness tools. The instructions may further include functionality for obtaining, from a controlled data source, business data collected by a plurality of business tools. The instructions may further include functionality for generating a first task of the plurality of tasks based on the fitness data, and a second task of the plurality of tasks based on the business data. The instructions may further include functionality for analyzing the first task and the second task to generate a plan using a predetermined benchmark. The instructions may further include functionality for presenting the plan to the user.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention provide a method, a system, and a computer readable medium for integrating business and fitness tasks and providing a plan of some type to users in some manner. The tasks may include fitness data collected by fitness tools. The tasks may further include business data collected by business tools. Embodiments of the invention analyze the fitness data and the business data of the user to produce a plan. The plan may include recommendations and/or insights regarding any pending and/or completed tasks of the user. The plan may further include notifications and results. The notifications may also include recommendations and/or insights regarding any pending and/or completed tasks and/or results that may be presented to the user. The notifications and/or results may include vocal, audible, graphical, tabular, and/or textual data describing the user's activity.

Figure 1:
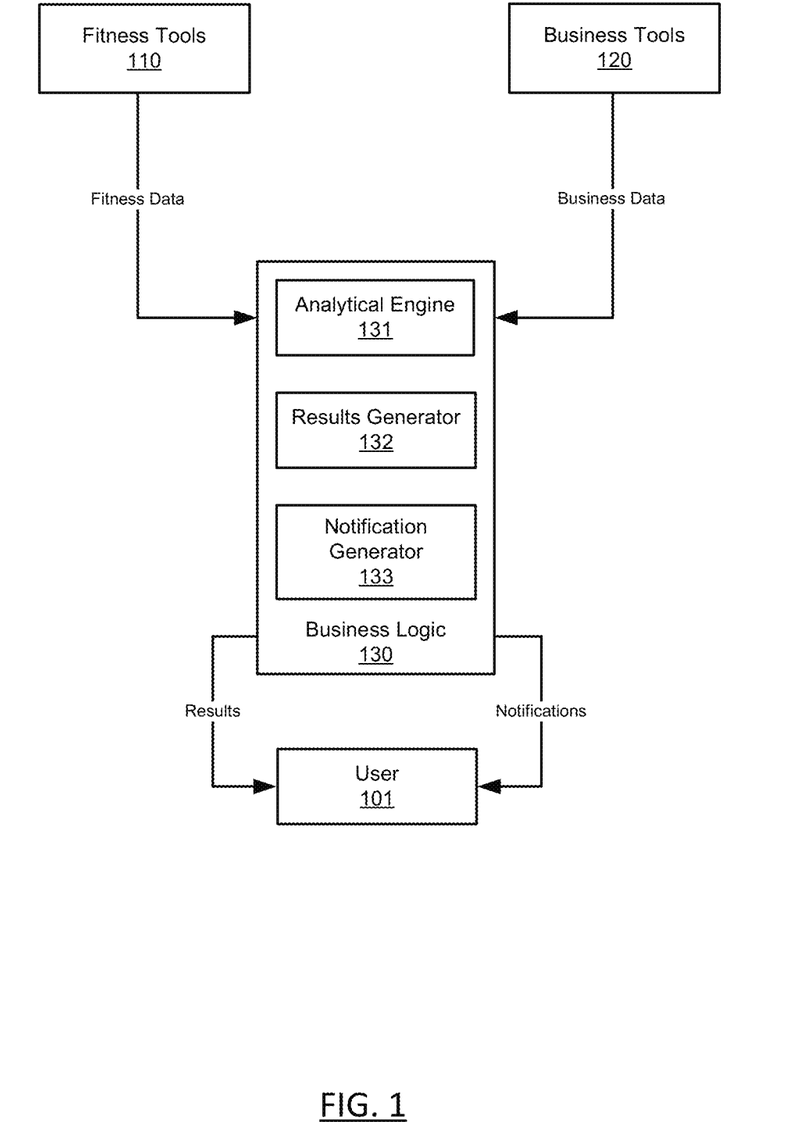
FIGS. 1 and 2 show a schematic diagram of a system in accordance with one or more embodiments of the invention.
Figure 2:
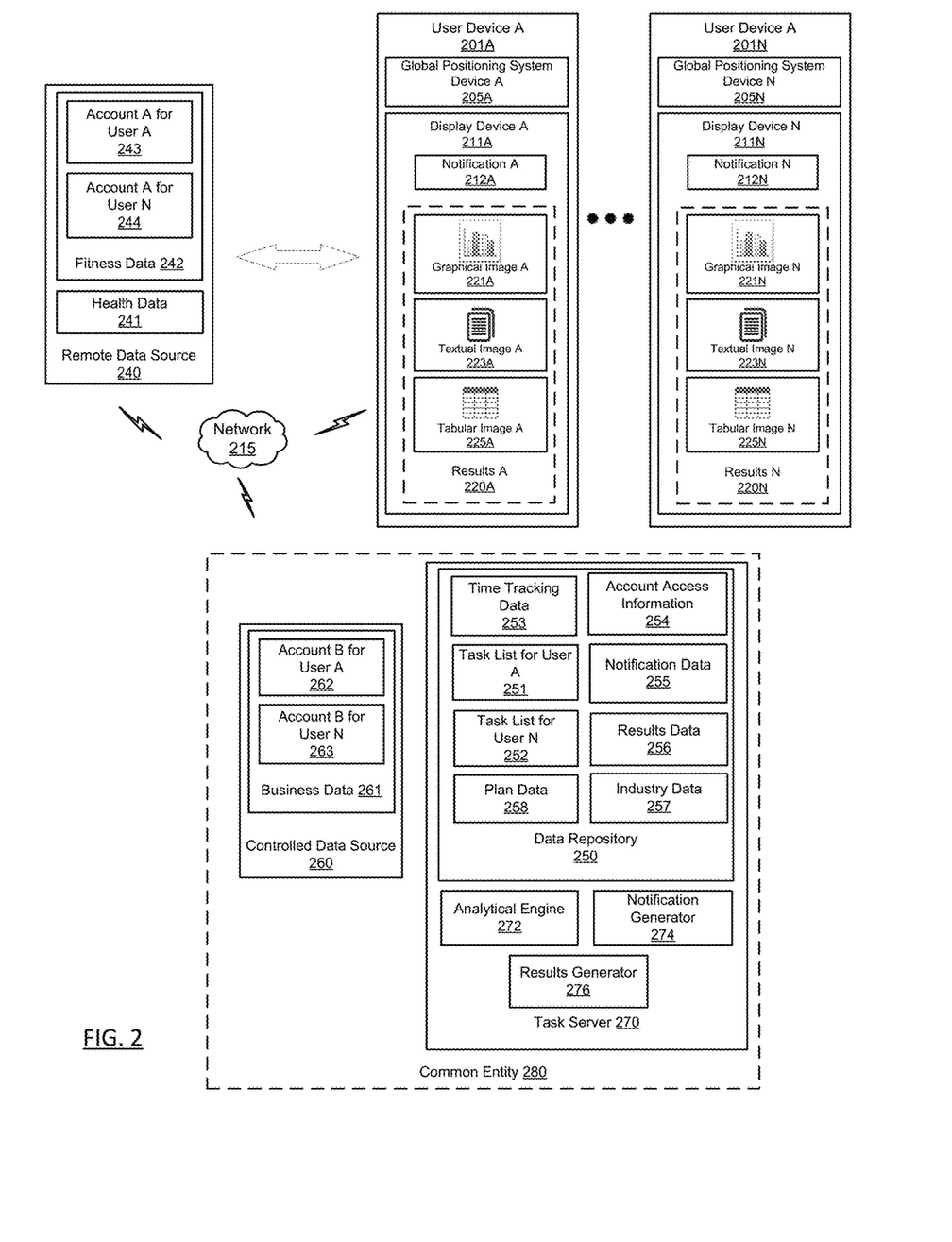

FIGS. 1-2 show a schematic diagram of a system in accordance with one or more embodiments of the invention. While FIGS. 1-2 show a configuration of components, other configurations may be used without departing from the scope of the invention. For example, various components may be combined to create a single component. As another example, the functionality performed by a single component may be performed by two or more components.

As shown in FIG. 1, in accordance with one or more embodiments of the invention, the system includes one or more fitness tools (e.g., fitness tools (110)) of a user (101), one or more business tools (e.g., business tools (120)) of the user (101), and business logic (130) (e.g., analytical engine (131), results generator (132), notification generator (133)).

In one or more embodiments of the invention, the fitness data collected by the fitness tools (110) of the user (101) and the business data collected by the business tools (120) of the user (101) are the inputs into the system. The business logic (130) of the system processes the fitness data collected by the fitness tools (110) and the business data collected by the business tools (120) to output a plan (not shown) generated by the analytical engine (131). The plan (not shown) may include notifications and/or results that are created by the notification generator (133) and the results generator (132), respectively.

In one or more embodiments of the invention, the outputs from the system include a plan (not shown) from the analytical engine (131), one or more notifications from the notification generator (133), and/or one or more results from the results generator (132). In one or more embodiments of the invention, the notifications, results, and/or the plan may be presented to the user (101) in various formats, including, for example, but not limited to a mobile phone, a laptop computer, a desktop computer, a tablet computer, virtual reality viewer, smart phone, smart watch, smart wristband, smart jewelry, smart eyewear, smart contact lens, and/or computer display glasses or goggles.

Although not shown in FIG. 1, location data and/or industry data may also be inputs into the system in order to provide a user with a plan for fitness and business tasks. Location data may include, for example, but is not limited to GPS coordinates and/or geographical location of a fitness establishment, user, employee, business entity, and/or client. Location data may be presented on a map for the purposes of detailing locations of the user, routes to various destinations, and/or other locations of interest. Industry data may include, for example, but is not limited to financial data, business entity information, and/or the industry of a business entity, user, business owner, employee, and/or client.

FIG. 2 shows a system in accordance with one or more embodiments of the invention. As shown in FIG. 2, the system includes one or more user devices (e.g., user device A (201A), user device N (201N)), a remote server (e.g., remote data source (240)), a controlled server (e.g., controlled data source (260)), and a task server (e.g., task server (270)) operatively connected by a wired or wireless network (215) (e.g., a local area network (LAN), a wide area network (WAN) such as the Internet, mobile network, any other type of network, or any combination thereof).

The user devices (e.g., user device A (201A), user device N (201N)), the remote data source (240), the controlled data source (260), and/or the task server (270) may take the form of a specialized computer system. The user devices (e.g., user device A (201A), user device N (201N)), the remote data source (240), the controlled data source (260), and/or the task server (270) may be implemented on the same or different specialized computer systems of the type found and described in relation to FIG. 7.

In one or more embodiments, a user device (e.g., user device A (201A), user device N (201N)) may be a combination of hardware and software configured to display data using a display device (e.g., display device A (211A), display device N (211N)). For example, a user device (e.g., user device A (201A), user device N (201N)) may be a mobile phone, a desktop computer, a laptop computer, a tablet computer, or any other device configured to operate as described herein.

In one or more embodiments, a user device (e.g., user device A (201A), user device N (201N)) is configured to display notifications (e.g., notification A (212A), notification N (212N)) and/or results (e.g., results A (220A), results N (220N)). The results (e.g., results A (220A), results N (220N)) may include audible data (not shown), graphical data (e.g., graphical image A (221A), graphical image N (221N)), textual data (e.g., textual image A (223A), textual image N (223N)), and/or tabular data (e.g., tabular image A (225A), tabular image N (225N)) describing the user's activity.

In one or more embodiments, the user device is configured to allow the user to interact with and/or select the notifications and/or results displayed on the display device. In one or more embodiments, the user may be presented with more detailed information regarding the notifications and/or results in response to interacting with and/or selecting the notifications and/or results displayed on the display device (e.g., display device A (211A), display device N (211N)). In one or more embodiments, the user device includes a global position system (GPS) device (e.g., global position system device A (205A), global position system device N (205N),) configured to determine GPS coordinates of the user device. The GPS device may be used to track the location, activity, movement, and/or distance traveled of the user.

In one or more embodiments, the remote data source (240) is a combination of hardware and software configured to store fitness data (242) collected by fitness tools (110) within various user accounts (e.g., account A for user A (243), account A for user N (154)). Further, the remote data source (240) may be configured to store health data (e.g., health data (241)) of the user within the various user accounts (e.g., account A for user A (243), account A for user N (154)) or inputted manually by the user. While the remote data source (240) is shown as an individual server in FIG. 2, each server may include various hardware servers for storing, analyzing, and retrieving data from user accounts. Further, the remote data source (240) may include multiple distinct hardware units and/or devices. The multiple hardware units and/or devices may or may not be of the same type or located at the same physical site. The remote data source (240) may be a host for a social networking site, a fitness tracker site, a fitness site synchronized with a user's fitness tools (110), an email hosting site, and/or other online entity configured for providing fitness and/or health services to a user over the network.

In one or more embodiments of the invention, the remote data source (240) may include fitness tools (110) of the user. The fitness tools (110) of the user and/or the remote data source (240) may have the ability to communicate, synchronize, and/or transfer data with the user device (e.g., user device A (201A), user device N (201N)). In one or more embodiments, the fitness tools (110) may include wearable devices, sensors, and/or user devices that collect fitness data (e.g., smart watch, smart wristband, smart jewelry, smart eyewear, smart contact lens, keyfobs, heart rate monitor, pedometer, mobile phone, GPS device, etc.). The fitness tools (110) may also be used to collect and track fitness data (242) regarding the user's activity, completed tasks, and/or yet-to-be completed tasks (e.g., steps, stairs climbed, distance, calories ingested, calories burned, active minutes, weight and/or strength training statistics such as number of repetitions, sets, tempo, exercise types, and/or value of weight/dumbbell/barbell moved, etc.). The health data (241) may include health information and statistics regarding the user (e.g., height, weight, sex, age, muscle mass, endurance, bone and bone mineral density, metabolic rate, insulin sensitivity, blood sugar, GLUT 4 density, cardiovascular health, body fat, blood pressure, HDL/LDL cholesterol, triglycerides, medical history, medications, prescriptions, contact lens, food consumption, sleep data such as light, deep, and REM data, etc.).

In one or more embodiments of the invention, the business tools may include software and/or hardware that maintain and/or collect business data (e.g., mobile device, laptop computer, agenda, office software, financial data, accounting software, productivity software, customer data, client data, vendor data, transactions, banking expenses, taxes, payroll, bills, payments, running reports, etc.). The business tools may be used to track business data of the user regarding completed and/or yet-to-be completed business tasks. The business data may be extracted from one or more user accounts (e.g., account B for user A (262), account B for user N (263)) hosted by one or more controlled data sources (e.g., controlled data source (260). In one or more embodiments, the task server (270) and controlled data source (260) may be operated by a common entity (e.g., common entity (280)). Consequently, the user may configure the accounts (e.g., account B for user A (262), account B for user N (263)) hosted by the controlled data source (260) to share user business data (261) with the task server (270).

In one or more embodiments, the task server (270) is a combination of hardware and software configured to analyze (e.g., analytical engine (272)) fitness data (242) and business data (261) to generate one or more plans that may be stored as plan data (e.g., plan data (258)) comprising one or more notifications (e.g., notification data (236)) generated by a notification generator (e.g., notification generator (274)) and/or one or more results (e.g., results data (256)) generated by a results generator (e.g., results generator (276)). Further, the task server (270) may include multiple different hardware units and/or devices. The multiple hardware units and/or devices may or may not be of the same type or located at the same physical site.

Figure 7:
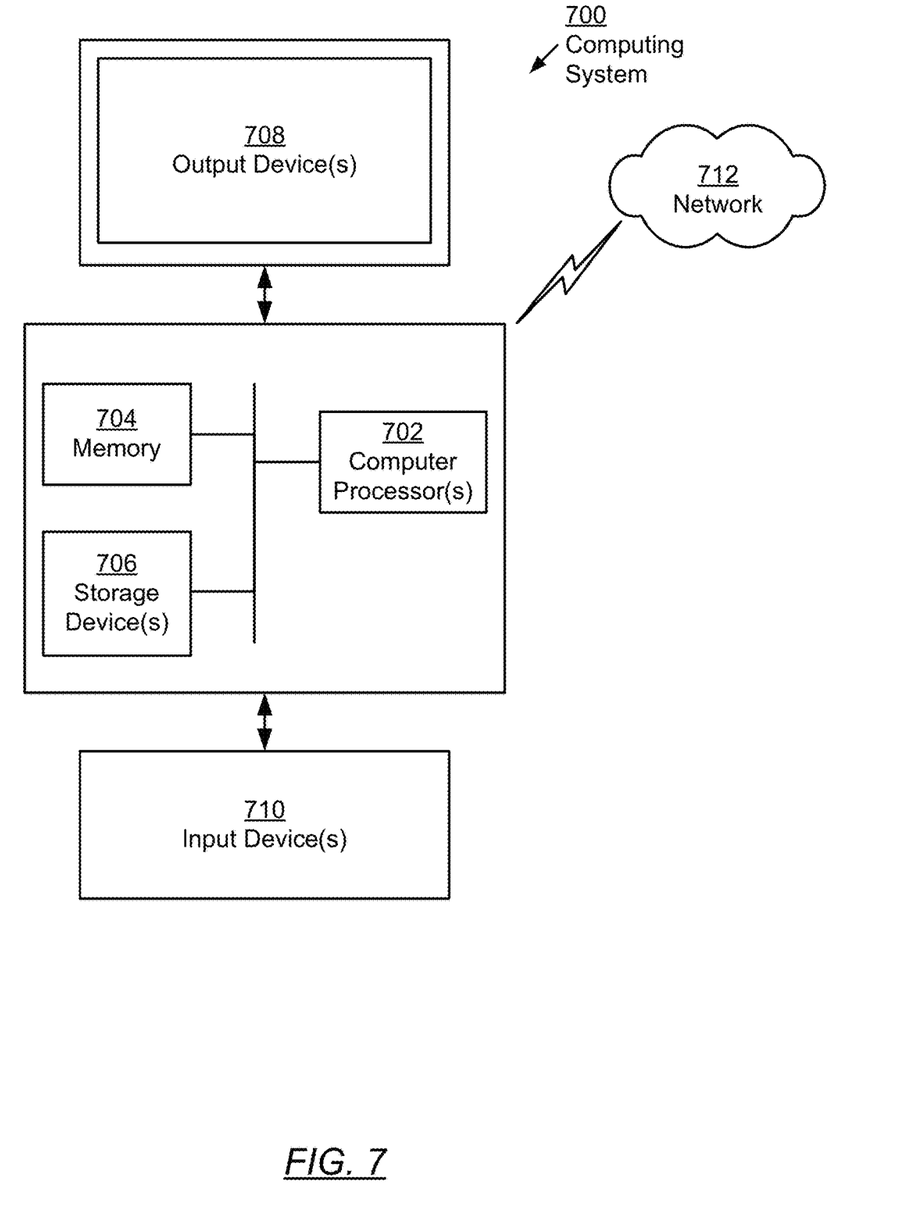
FIG. 7 shows a computing system in accordance with one or more embodiments of the invention.

In one or more embodiments, the task server (270) may be a specialized computer of the type described below in connection with FIG. 7. Further, the task server (270) may be operatively connected to one or more user devices (e.g., user device A (201A), user device N (201N)), one or more remote servers (e.g., remote data source (240)), and/or one or more controlled servers (e.g., controlled data source (260)). In particular, the connection between the task server (270) and other servers may be direct, indirect, wired, wireless, or a combination thereof. The task server (270) may store various data (e.g., task list for user A (251), task list for user N (252), time tracking data (253), account access information (254), notification data (255), results data (256), industry data (257), plan data (258)) in various data structures within a data repository (e.g., data repository (250)).

In one or more embodiments of the invention, the data repository (e.g., data repository (250)) is any type of storage unit and/or device (e.g., a file system, database, collection of tables, or any other storage mechanism) for storing data. Further, the data repository (e.g., data repository (250)) may include multiple different storage units and/or devices. The multiple different storage units and/or devices may be of the same type or located at the same physical site.

In one or more embodiments, a task list (e.g., task list for user A (251), task list for user N (252)) may include any completed or yet-to-be completed activities of the user. For example, a fitness task may include, for example, but is not limited to, take X steps, climb Y stairs, walk Z miles, ingest A calories, burn B calories, and/or perform C minutes of active exercise, where X, Y, Z, A, B, and C are variables with any values and/or alphanumeric parameters. Similarly, a business task may include, for example, but is not limited to, complete task W on the business agenda, perform X bank transactions, convert Y estimate into an invoice, and/or email Z invoice to a client, where W, X, Y, and Z are variables with any values and/or alphanumeric parameters.

In one or more embodiments, the task server (270) automatically updates a user's respective task list (e.g., task list for user A (251), task list for user N (252)) based on the tasks extracted from the fitness data (242) and/or business data (261) obtained from various servers. For example, the task list (e.g., task list for user A (251), task list for user N (252)) may be updated with fitness tasks extracted from the fitness data (242), and/or with business tasks extracted from the business data (261). Furthermore, the task server (270) may update details regarding the plans (258) generated by the analytical engine (272), the notifications (e.g., notification data (255)) generated by the notification generator (274), and/or the results (e.g., results data (256)) generated by the results generator (276) based on any changes and/or updates in a user's fitness data (242) and/or business data (261).

In one or more embodiments, the task server (270) is configured to store access credentials securely (e.g., account access information (254)) for a user account (e.g., account A for user A (243), account A for user N (154), account B for user A (262), account B for user N (263)). The access credentials may be received from a user and may include a user name, password, biometric authentication such as fingerprint, retinal, iris, facial scan, etc. In one or more embodiments, the user authorizes the remote data source (240) to send fitness data (242) to the task server (270). As such, the user may synchronize information from his or her user accounts on one or more remote data sources with the task server (270). In one or more embodiments, the task server (270) and controlled data source (260) may be operated by a common entity (e.g., common entity (280)). Consequently, the user may configure the accounts (e.g., account B for user A (262), account B for user N (263)) hosted by the controlled data. source (260) to share user business data (261) with the task server (270).

In one or more embodiments, the task server (270) is configured to store time tracking data (e.g., time tracking data (238)) regarding any activities of the user. For example, the task server may track the amount of time a user spends completing business tasks while driving, biking, running and/or walking. The task server may track the amount of time a user spends completing fitness tasks while driving, biking, running and/or walking. Furthermore, the task server may track the amount of time a user spends completing business tasks and/or fitness tasks while in the office versus while mobile. The task server may also track the amount of time doing business tasks while sitting, standing, a combination of sitting and standing, using treadmill, and/or time spent taking breaks.

In one or more embodiments, the task server (270) may store industry data (e.g., industry data (257)) in order to provide a user with a plan for business and fitness tasks. Industry data may include, for example, but is not limited to financial data, business entity information, and/or the industry of a business entity, user, business owner, employee, and/or client.

Figure 3:
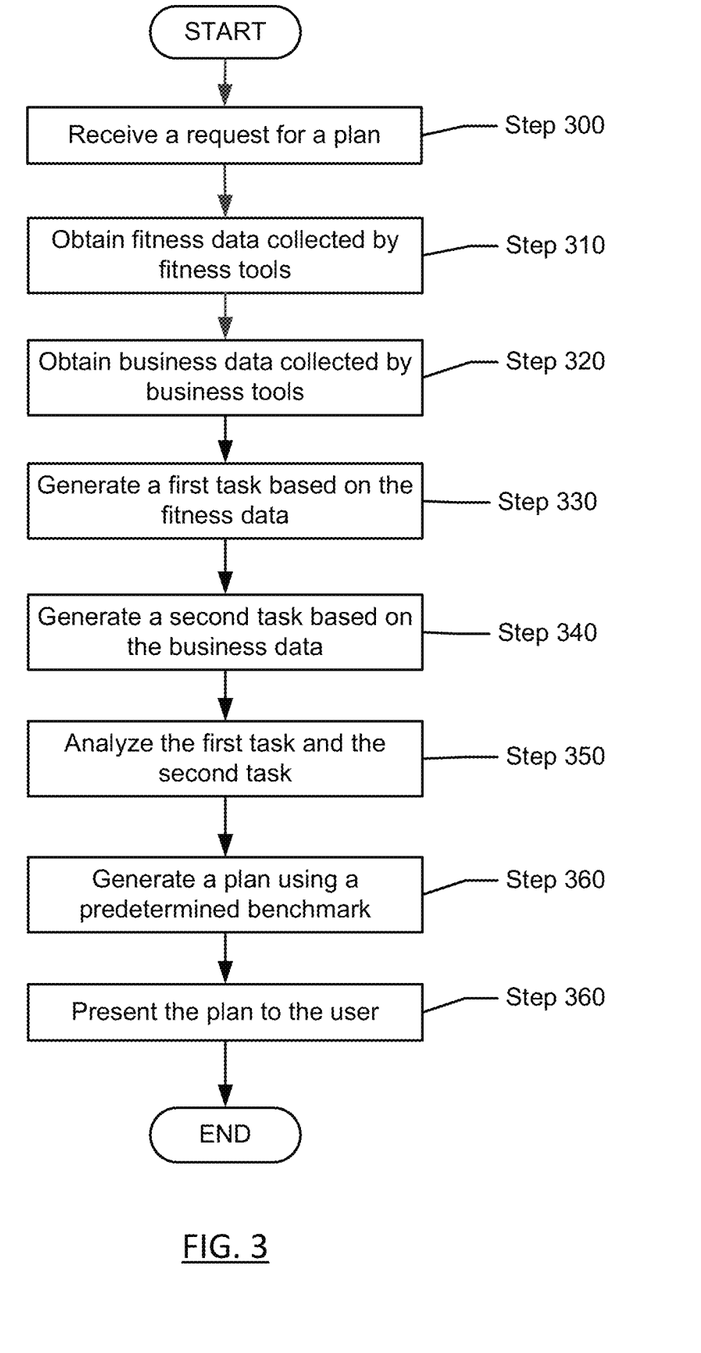
FIGS. 3, 4, and 5 show flowcharts in accordance with one or more embodiments of the invention.
Figure 4:
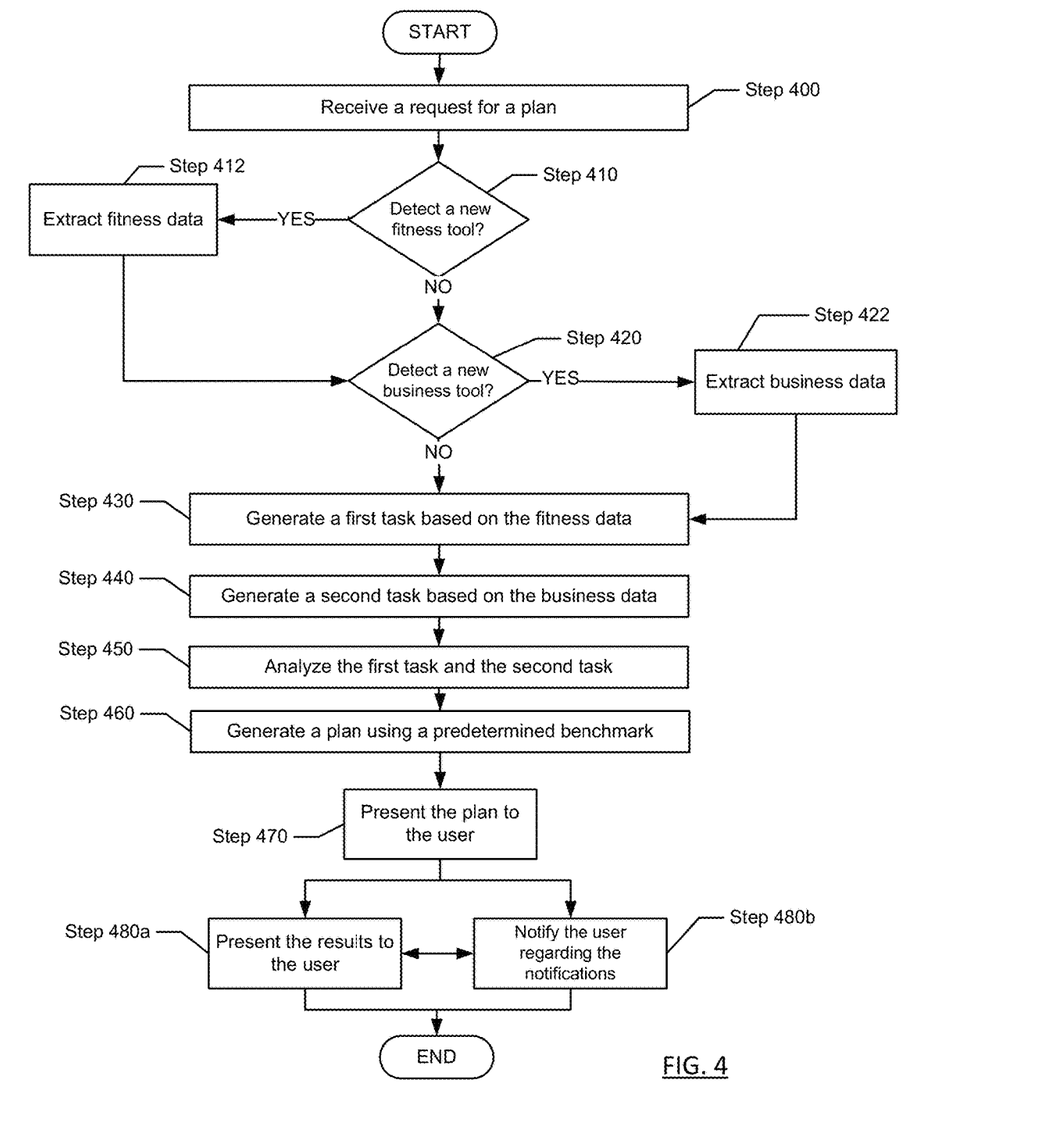
Figure 5:
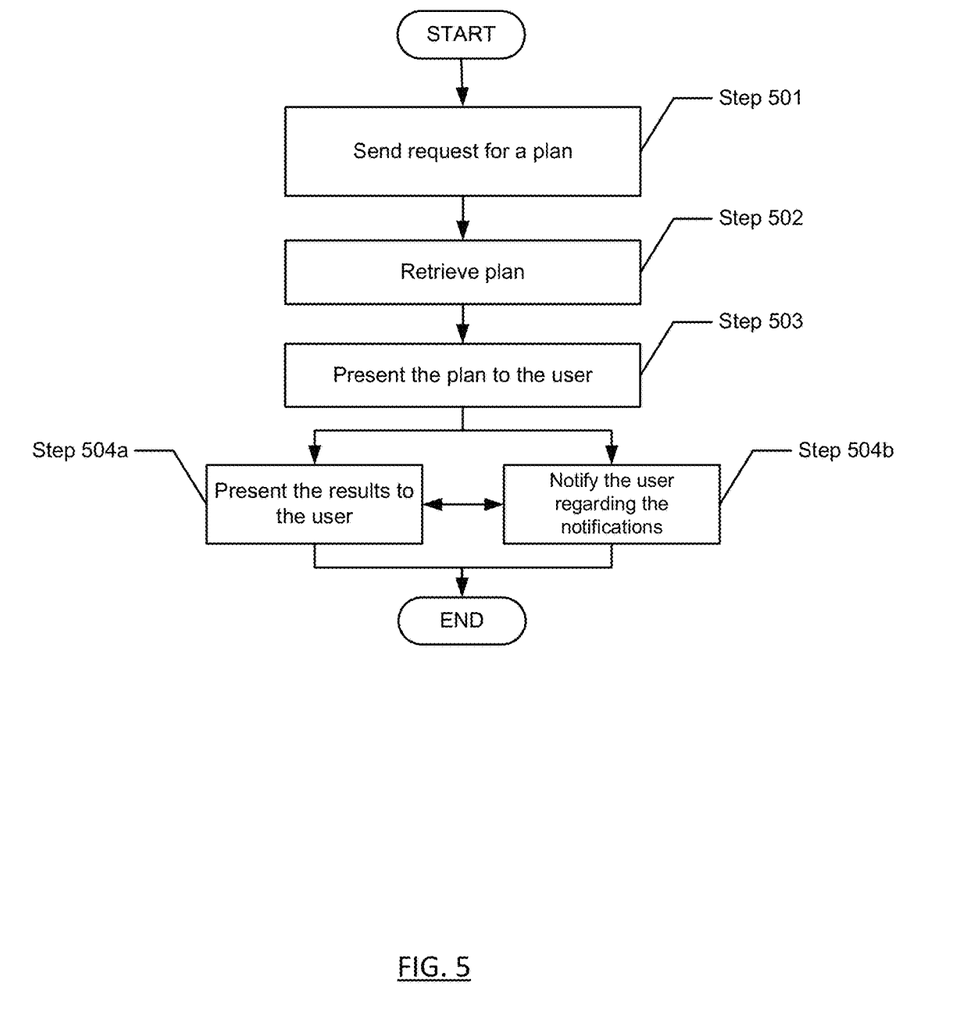

FIGS. 3, 4, and 5 show flowcharts in accordance with one or more embodiments. While the various steps in these flowcharts are presented and described sequentially, one of ordinary skill in the art will appreciate that some or all of the steps may be executed in different orders, may be combined or omitted, and some or all of the steps may be executed in parallel. Furthermore, the steps may be performed actively or passively. Any examples discussed herein are for explanatory purposes only and not intended to limit the scope of the invention.

FIG. 3 shows a flowchart describing a method for providing plans for business and fitness tasks to users in accordance with one or more embodiments of the invention.

In Step 300, in one or more embodiments of the invention, a request for a plan is received from a user device by a task server (e.g., via a user device). In one or more embodiments of the invention, the request for the plan is received via a wireless connection. For example, the user device may initiate a request to view a plan based on a pending fitness and/or business task displayed to the user.

In Step 310, various user accounts are accessed in accordance with one or more embodiments. In one or more embodiments, fitness data may be extracted and collected from various user accounts for one or more users stored on a remote data source. For example, a user may grant a task server permission to login and/or access information on various third party accounts owned by the user. As such, the user may provide access credentials (e.g., user name, password, biometric authentication such as fingerprint, retinal, iris, facial scan, etc.) to the task server for each account on a remote data source. In one or more embodiments, the user may configure the third party accounts to share user fitness data with the task server. User fitness information is aggregated from various user accounts in accordance with one or more embodiments. In one or more embodiments, for example, a task server may collect remote data including fitness data from various remote data sources. Fitness data may include, for example, but is not limited to, calories burnt and/or projected calories burnt while sitting, standing, sitting & standing, steps, stairs climbed, walking, movement, age, weight, body mass index, heart rate, age, medical data, and/or time spent.

In Step 320, various user accounts associated with the controlled data source are accessed in accordance with one or more embodiments. In one or more embodiments, business data may be extracted and collected from various user accounts for one or more users hosted by a controlled data source. For example, a user account hosted by the controlled data source may grant a task server permission to login and/or access information on various accounts owned by the user and hosted by the common entity. As such, the user may provide access credentials (e.g., user name, password, biometric authentication such as fingerprint, retinal, iris, facial scan, etc.) to the task server for each account on a controlled data source. In one or more embodiments, since the task server and controlled data source are operated by a common entity, the user may configure the accounts hosted by the controlled data source to share user business data with the task server. Business data is obtained from controlled data and various user accounts hosted by the controlled data source in accordance with one or more embodiments. In one or more embodiments, for example, a task server may collect controlled data including pending and/or completed business tasks from various controlled data sources. Business data may include, for example, but is not limited to, financial data, business type, transactions, invoices, payments, expenses, banking, P&L reports, balance sheet, income, liabilities, tax info, time spent, travel, online and/or in person banking.

In Step 330, the task server may identify and/or generate in accordance with one or more embodiments a first task based on the fitness data obtained in Step 310. For example, the task server may identify a user has burned a total of 50 calories throughout the day. The user may set a benchmark goal of burning 500 calories for the day; consequently the user has an additional 450 calories to burn before the end of the day. Therefore, a fitness task of burning 450 calories may be generated for the user.

In Step 340, the task server may identify and/or generate in accordance with one or more embodiments a second task based on the business data obtained in Step 320. For example, the task server may identify within the business data that a user has an entry within his/her agenda for converting an estimate into an invoice. Consequently, a pending business task of converting an estimate into an invoice may be generated for the user.

In Step 350, after generating the first and second task, the task server may analyze the first and second task. In one or more embodiments of the invention, one or more tasks may be analyzed, and each task may be analyzed individually or in combination in order to determine an optimal plan that will consequently result in the most efficient health improvements and/or business improvements for the user.

In Step 360, a plan may be generated by the task server using a benchmark. In one or more embodiments of the invention, a benchmark may predetermined and be a goal and/or a criterion that may be designated by the user for completing a task. In one or more embodiments, one or more plans may be generated for the user. Each plan may focus on improving a specific metric. For example, a first plan may focus on those activities best for improving health, a second plan may focus on those activities best for improving business efficiency, and a third plan may focus on the activities that are the best practice for improving both health and business efficiency.

In the aforementioned example, the user has an additional 450 calories to burn, as well as an estimate to be converted into an invoice. In this example, the user may designate a predetermined benchmark of increasing his/her health by 50%, as well as increasing his/her productivity by 50%. In one or more embodiments, a plan may be generated using these metrics of increasing health by 50% and increasing business productivity by 50% as benchmarks. Therefore, for example, a first plan generated by the task server may recommend the user to use a treadmill at his/her desk while using the computer, which would significantly increase the number of calories burned and increase his/her health by 50%. A second plan generated by the task server may recommend the user alternate between sitting and standing every 15 minutes, resulting in an increase of his/her health by 30% and an increase of his/her business efficiency by 20%. Further, a third plan generated by the task server may recommend for the user to alternate sitting with standing every 15 minutes in addition to taking a 15 minute walk every 2 hours, which would result in an increase of his/her health by 35% and an increase in his/her business efficiency by 15%.

In Step 360, a plan and any accompanying notifications and/or results may be presented to the user. In one or more embodiments of the invention, results may be generated in conjunction with the notifications. In one or more embodiments, the user may be presented with one or more plans, and each plan may include notifications and results. The notifications may include recommendations and/or insights regarding how to implement the plan being presented to the user. The results may include audible, graphical, tabular, and/or textual data regarding the outcomes of a user's plan. The results may further include predictions regarding future outcomes if the user continues to follow a plan. The notifications may include results for presentation to the user.

In one or more embodiments, for example, a user may have a business task of downloading and reviewing client bank transactions, and a fitness task of walking 500 additional steps before the end of the day. Following the analysis done by the task server, the plan generated may include a recommendation for the user to perform the business task on his/her mobile device, and a notification may be sent to the user informing him/her to download a business app on his/her phone and to login with his/her user account credentials in order to complete the business task while mobile. The notification may further include a recommendation for the user to complete his/her pending business task of downloading and reviewing client bank transactions while simultaneously going for a walk to complete his/her pending fitness task of 500 steps. The results within the notification may include informing the user that they have added 2,555 steps, burned 245 calories, completed 12 transactions, and improved productivity by 5%. The results within the notification may further inform the user that if they work like this each day, they will add 20 days to their life and work 10% more efficiently every month.

FIG. 4 shows a flowchart in accordance with one or more embodiments for a method for providing plans for business and fitness tasks to users. In Step 400, in one or more embodiments of the invention, a request for a plan is received from a user device by a task server (e.g., via a user device). In one or more embodiments of the invention, the request for the plan is received via a wireless connection. For example, the user device may initiate a request to view a plan based on a prompt displayed to the user on his/her user device.

In Step 410, a determination is made whether a new fitness tool and/or a new source for fitness data is detected associated with the remote server and/or associated with a direct, indirect, wired, wireless, or a combination thereof, with a mobile device of the user. In one or more embodiments, for example, the task server accesses the remote data source and determines whether a new user account with new fitness data is detected. In one or more embodiments, the user account associated with the remote data source is checked at periodic intervals (e.g., daily, weekly, whenever the user device requests a plan, notifications, and/or results, etc.) for new user accounts and/or new fitness data. In one or more embodiments, a new fitness tool may establish direct, indirect, wired, wireless, or a combination thereof, with a user's mobile device to exchange fitness data. If no new remote data source, no new fitness tool, and/or no new fitness data source are detected, then the process proceeds to Step 420. If a new remote data source, a new fitness tool and/or a fitness data source is detected, then the process proceeds to Step 412.

In Step 412, various types of data and/or fitness tasks may be extracted from aggregated fitness data from various remote user accounts in accordance with one or more embodiments. Access credentials are obtained for a remote user account in accordance with one or more embodiments. In one or more embodiments, a remote user account may be on a remote server and/or remote data source. The access credentials may be received from a user and provide the task server with the capability to log into the remote data source using the remote user account. Furthermore, the task server may log into a respective user account and extract fitness data collected by various fitness tools associated with the respective user account. The fitness data and/or fitness tasks extracted from the user accounts may then be stored in the data repository of the task server. In one or more embodiments, the task server may then extract fitness tasks from aggregated fitness data obtained from the remote data source and store them in the data repository of the task server. Fitness data may also be extracted from fitness tools associated with the user accounts hosted by the remote data source. Fitness data may also be extracted from fitness tools that are connected with direct, indirect, wired, wireless, or a combination thereof, with a mobile device of the user. In one or more embodiments, fitness tasks may be identified within the fitness data, and a corresponding plan, notification, and/or results may be generated.

In Step 420, a determination is made whether a new business tool and/or a new business data source is detected associated with the controlled data source in accordance with one or more embodiments. In one or more embodiments, for example, the task server accesses the controlled data source and determines whether a new user account and/or a new business tool with new business data is detected. In one or more embodiments, the controlled user account is checked at periodic intervals (e.g., daily, weekly, whenever the user device requests a plan, etc.) for new user accounts, a new business tool and/or a new business data source. If no new user account, no new business tool and/or no new business data source are detected, then the process proceeds to Step 430. If a new controlled data source, a new business tool, and/or a new business data source, then the process proceeds to Step 422.

In Step 422, various business data is obtained from business tools associated with various user accounts associated with the controlled data source in accordance with one or more embodiments. Access credentials are obtained for a controlled user account in accordance with one or more embodiments. In one or more embodiments, if the user account is on a controlled server, the task server may forgo access credentials for the user account. Within user transaction data, business tasks may be identified, and a corresponding plan, notification, and/or results may be generated that is associated with the business data. In one or more embodiments, the user accounts may be located on controlled data sources.

In Step 430, the task server may identify and/or generate a first task based on the fitness data obtained in Step 412 in accordance with one or more embodiments. For example, the task server may identify a user has burned a total of 50 calories throughout the day. The user may set a benchmark goal of burning 500 calories for the day. Consequently, the user has an additional 450 calories to burn before the end of the day. Therefore, a fitness task of burning 450 calories may be generated for the user.

In Step 440, the task server may identify and/or generate a second task based on the business data obtained in Step 422 in accordance with one or more embodiments. For example, the task server may identify within the business data that a user has an entry within his/her agenda for converting an estimate into an invoice. Consequently, a pending business task of converting an estimate into an invoice may be generated for the user.

In Step 450, after generating the first and second task, the task server may analyze the first and second task. In one or more embodiments of the invention, one or more tasks may be analyzed, and each task may be analyzed individually or in combination in order to determine the optimal plan that will result in the most efficient health improvements and/or business improvements for the user.

In Step 460, a plan may be generated by the task server using a benchmark. In one or more embodiments of the invention, a benchmark may be predetermined and a goal and/or a criterion for completing a task. In one or more embodiments, one or more plans may be generated for the user. Each plan may focus on improving a specific metric. For example, a first plan may focus on those activities best for improving health, a second plan may focus on those activities best for improving business efficiency, and a third plan may focus on the activities that are the best practice for improving both health and business efficiency.

In Step 470, a plan and any accompanying notifications and/or results may be presented to the user. In one or more embodiments of the invention, results may be generated in conjunction with the notifications. In one or more embodiments, the user may be presented with one or more plans, and each plan may include notifications and results.

In Step 480a and Step 480b, results and/or notifications may be presented to the user. The notifications may include recommendations and/or insights regarding how to implement the plan being presented to the user. The notifications may be presented in pictorial, textual, vocal, and/or audible format. The results may include vocal, audible, graphical, tabular, and/or textual data regarding the outcomes of a user's plan. The results may further include predictions regarding future outcomes if the user continues to follow a plan. The notifications may include results for presentation to the user.

FIG. 5 shows a flowchart in accordance with one or more embodiments for a method for providing plans for business and fitness tasks to users. In Step 501, in one or more embodiments of the invention, a request for a plan is sent from a mobile device to a task server (e.g., via a user device). In one or more embodiments of the invention, the request for the plan is sent via a wireless connection. For example, the user device may initiate a request to view a plan based on a task list displayed to the user.

In Step 502, a plan including notifications and/or results is obtained from the task server. The plan, notifications, and/or results may be organized by a selected user criterion in accordance with one or more embodiments. As such, in Step 504a and/or Step 504b, the user device may receive notifications and/or results regarding a plan that is configured to be displayed in a predetermined order designated by the user on the user device. In one or more embodiments, the task server determines which plans, notifications, and/or results satisfy the selected user criteria for display to the user. As such, the task server sorts the plans, notifications, and/or results accordingly for the predetermined order. In one or more embodiments, the task server sends various plans, notifications, and/or results to the user device, and the plans, notifications, and/or results are filtered by the selected criteria on the user device. Various user criteria may be selected for organizing plans, notifications, and/or results in accordance with one or more embodiments. In one or more embodiments, for example, the user device receives an input from the user regarding how to organize the plans, notifications, and/or results. In one or more embodiments, for example, the plans, notifications, and/or results may be presented in the form of visualizations, such as an image, symbol, and/or outline of, for example, a person, that includes an indicator, such as filling up with a color and/or pattern, as the user progresses, becomes healthier, and/or completes the day's tasks. The visualizations may appear on a user device, fitness tool, and/or business tool of the user, such as a smart watch, for a quick view of how the user is progressing.

In one or more embodiments, for example, the plans, notifications, and/or results may be directed to a specific category, such as, but not limited to, graphs and/or charts, end of day summary, best practices for health, best practices for business efficiency, best practice for both health and business efficiency. Categories may further sort data into, but not limited to, comparison charts comparing mobile versus stationary, sitting versus standing versus treadmill desk versus alternating sitting & standing versus adding a walking break, calories burned while driving, biking, running and/or walking, number of business tasks completed while driving, biking, running and/or walking, time spent completing business tasks while driving, biking, running and/or walking, time spent completing fitness tasks while driving, biking, running and/or walking.

In one or more embodiments, categories may further sort data into, but not limited to, comparison charts comparing rankings of company health by history, rankings of business efficiency by industry, rankings of health and productivity by employee, by number and/or type of tasks completed, rankings of number of sick days, rankings of employee morale, rankings of employee retention, rankings of improved insurance rates, rankings of customer service. Categories may further sort data into, but not limited to, comparison charts comparing monthly and/or yearly changes in employee health and business productivity. Categories may further sort data into, but not limited to, comparison charts comparing rank health versus business efficiency for each employee and/or business owner, month by month and/or year by year comparisons between combined health and business efficiency for 1-5 years, and/or breakdown of health and business activities.

In one or more embodiments, categories may further sort data into, but not limited to, comparison charts comparing statistics for age-related weight gain, as well as differences in weight and longevity of healthy versus non-healthy employees and/or business owners. Categories may further sort data into, but not limited to, comparison charts comparing calories burned when in the office versus when mobile, and/or when both in the office and mobile. Categories may further sort data into, but not limited to, comparison charts comparing health and/or business efficiency while creating new transactions, reconciling transactions, capturing expenses, connecting banks, doing payroll, accepting payments, running reports, and/or emailing invoices. Categories may further sort data into, but not limited to, comparison charts comparing calories, nutrition, and/or food eaten during the day.

In one or more embodiments, categories may further sort data into, but not limited to, comparison charts comparing number of steps taken over a period of time, versus the number of days and/or years added to the user's life. Categories may further sort data into, but not limited to, comparison charts comparing number of days with a healthy heart rate, blood pressure, blood sugar, and/or body weight versus the number of days and/or years added to the user's life. Categories may further sort data into, but not limited to, comparison charts comparing number of sick days expected versus number of steps taken, calories burned, and/or business efficiency gained. Categories may further sort data into, but not limited to, comparison charts showing months and/or years of changes in an employee's health and/or business productivity. Categories may further sort data into, but not limited to, comparison charts comparing changes over time regarding years added to life and/or business efficiency gained.

In one or more embodiments, categories may further sort data into, but not limited to, steps taken and/or calories burned in the office versus when mobile and/or traveling. Categories may further include, but not limited to individual rankings amongst various users regarding most healthy, most efficient, most improved, and/or most balanced. Categories may further sort data into, but not limited to the day, week, month, and/or year a user is healthiest and/or a user's business efficiency is highest.

In one or more embodiments, notifications may further include information regarding whether a new fitness tool has been detected. For example, after a user synchronizes a fitness tool with a user device, a notification may notify the user that a fitness tool has been detected and may prompt the user whether the user approves of the new connection.

In one or more embodiments, the task server may track the location of a user using location information (e.g., GPS coordinates of the user device, GPS coordinates regarding one or more outlets of a fitness activity and/or business activity, a user's proximity to a location of a business activity, business entity, client, and/or fitness activity, the current travel distance to the business entity, client, and/or fitness activity, etc.) and may notify the user with notifications in order to inform the user of a plan for increasing their health and/or business efficiency. In one or more embodiments, for example, the task server may check the task list of a user and detect that the user has free time at 1:30 PM, and that the user is within a specified proximity distance set by the user to a fitness establishment (e.g., gym, park, running trail, yoga, healthy restaurant, etc.). The task server may generate a notification informing the user that they are within the designated proximity distance to the fitness establishment and that they may, for example, gain steps and increase calories burned which will allow the user to reach their benchmark 50% faster.

Furthermore, in one or more embodiments, for example, the task server may detect the location of the user, and the task server may determine that the user is within a specified proximity distance set by the user to a healthy restaurant. The task server may, for example, generate a notification to inform the user that there are a variety of healthy restaurants within walking distance of the user. In one or more embodiments, the task server may generate a map detailing the locations and/or routes to the locations of interest, and the map may be presented to the user. In one or more embodiments, the task server may generate a link accessible via the Internet associated with a fitness establishment, and present the link to the user within a notification. For example, the task server may generate one or more links associated with the healthy restaurants, which may include further information regarding the restaurants, such as a lunch and/or dinner menu.

In one or more embodiments, for example, the task server may detect the location of the user is within a specified proximity set by the user to a business activity (e.g., client, business entity, customer service, etc.). The task server may generate a notification informing the user that they are within the designated proximity distance to the business activity and that they may, for example, increase their business efficiency by visiting a client. Further, the task server may detect the location of a user while the user is traveling, and the task server may inform the user of a particular route to take for increased business efficiency. For example, the task server may detect that a user may save time when visiting a client if the user takes a certain route when traveling during various times of the day. In one or more embodiments, the task server may generate a link accessible via the Internet associated with a business activity, and present the link to the user within a notification.

In one or more embodiments, the task server may generate notifications that provide the user with health and/or business tips to increase the health and/or business efficiency of the user. For example, the task server may generate a notification informing the user that if the user parks his/her vehicle at a particular location of a parking lot, they will add 337 steps and burn 35 more calories.

In one or more embodiments of the invention, the plans, notifications, and/or results being generated by the task server may be transmitted to the user, in addition to one or more separate users. In one or more embodiments, if the owner of the fitness data and/or business data provides permission to share his/her fitness data and/or business data, his/her data may consequently be available for view by a separate user. For example, a business owner may receive the plans, notifications, and/or results of his/her employees. The business owner may consequently be able to track his/her employees' health and/or business efficiency.

Figure 6:
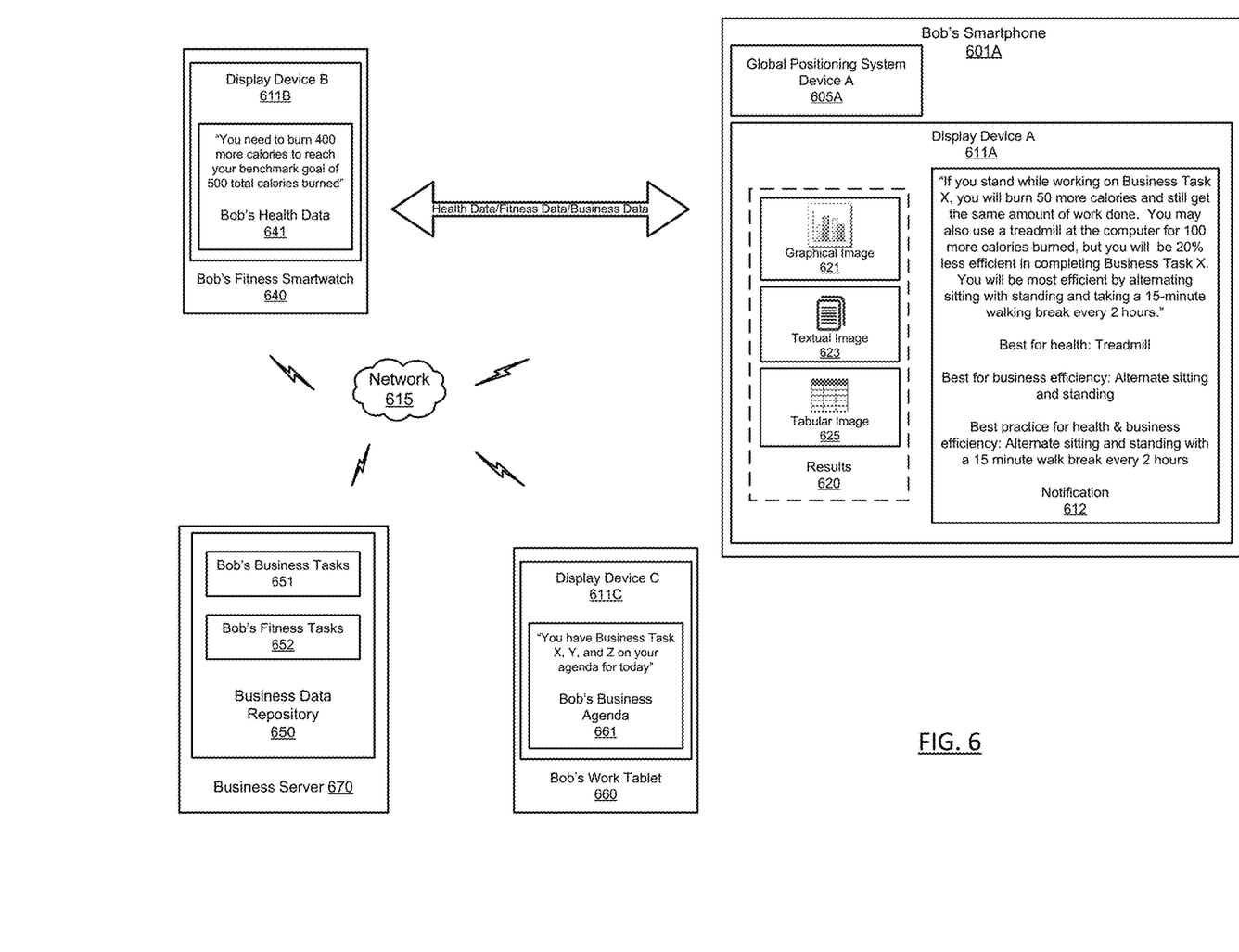
FIG. 6 shows an example in accordance with one or more embodiments of the invention.

FIG. 6 shows an example in accordance with one or more embodiments for a method for providing plans for business and fitness tasks to users. For the purposes of the example only, consider the scenario in which a user Bob is in possession of a user device (601A) that user Bob uses to interact with his plan, notifications, and/or results, which are hosted on a business server (670).

Bob's fitness smartwatch (640) collects Bob's fitness data and/or Bob's health data (641). Bob's smartphone (601A) and Bob's fitness smartwatch (640) may have capabilities of exchanging and/or synchronizing fitness, health, and/or business data through direct, indirect, wired, wireless, a combination thereof, and/or through the network (615). Bob's health data (641) is displayed on display device B (611B) of Bob's fitness smartwatch (640) and states that Bob needs to burn 400 additional calories to reach his benchmark goal of 500 total calories burned. Bob's health data (641) is transmitted from Bob's fitness smartwatch (640) through the network (615) to the business server (670) where it is stored within Bob's fitness tasks (652) hosted by the business data repository (650).

Bob's work tablet (660) includes Bob's business data and/or Bob's business agenda (661). Bob's smartphone (601A) and Bob's work tablet (660) may have capabilities of exchanging and/or synchronizing data through direct, indirect, wired, wireless, a combination thereof, and/or through the network (615). Bob's business agenda (641) is displayed on display device C (611C) of Bob's work tablet (660) and states that Bob has pending business tasks X, Y and Z to complete for the day, where X, Y, and Z are variables with any values and/or alphanumeric parameters. Bob's business agenda (661) is transmitted from Bob's work tablet (660) through the network (615) to the business server (670) where it is stored within Bob's business tasks (651) hosted by the business data repository (650).

Once Bob's fitness data (e.g., Bob's health data (641)) collected by Bob's fitness tools (e.g., Bob's fitness smartwatch (640)) and Bob's business data (e.g., Bob's business agenda (661)) collected by Bob's business tools (e.g., Bob's work tablet (660)) are retrieved and stored by the business server (670), the analytical engine (not shown) of the business server (670) generates a plan, the notification generator (not shown) of the business server (670) generates notifications, and/or the results generator (not shown) of the business server (670) generates results, based on Bob's fitness data (e.g., Bob's health data (641)) and Bob's business data (e.g., Bob's business agenda (661)).

After the generation of the plan, notifications, and/or results by the business server (670), the business server transmits the plan, notifications, and/or results for display (611A) on Bob's smartphone (601A). The notification (612) presents the plan to Bob, and states that Bob may stand while working on Business Task X, resulting in Bob burning 50 more calories and still getting the same amount of work done. Bob may also use a treadmill at the computer for 100 more calories burned, but Bob will become 20% less efficient in completing Business Task X. The notification may inform Bob that he will be most efficient by alternating sitting with standing and taking a 15-minute walking break every 2 hours. The notification also recommends to Bob that using the treadmill while working on business task X will be the best choice for optimal health benefits. The notification also recommends that Bob alternating sitting and standing while working on business task X will be the best choice for optimal business efficiency. The notification also recommends that Bob alternating sitting and standing with a 15 minute walk break every 2 hours will be the best practice for combined health & business efficiency.

Embodiments of the invention may be implemented on virtually any type of computing system regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 7, the computing system (700) may include one or more computer processor(s) (702), associated memory (704) (e.g., random access memory (RAM), cache memory, flash memory, etc.), one or more storage device(s) (706) (e.g., a hard disk, an optical drive such as a compact disk (CD) drive or digital versatile disk (DVD) drive, a flash memory stick, etc.), and numerous other elements and functionalities. The computer processor(s) (702) may be an integrated circuit for processing instructions. For example, the computer processor(s) may be one or more cores, or micro-cores of a processor. The computing system (700) may also include one or more input device(s) (710), such as a touchscreen, keyboard, mouse, microphone, touchpad, electronic pen, or any other type of input device. Further, the computing system (700) may include one or more output device(s) (708), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (700) may be connected to a network (712) (e.g., a local area network (LAN), a wide area network (WAN) such as the Internet, mobile network, or any other type of network) via a network interface connection (not shown). The input and output device(s) may be locally or remotely (e.g., via the network (712)) connected to the computer processor(s) (702), memory (704), and storage device(s) (706). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (700) may be located at a remote location and connected to the other elements over a network (712). Additionally, embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for coordinating communication between a remote data source, a first user fitness device, a second user fitness device, a controlled data source, and a task server, the method comprising:
   receiving, at the task server, first access credentials to a first user account on the remote data source,
      wherein the first user account stores fitness data obtained by the first user fitness device measuring a first property of a user;
   receiving, at the task server, second access credentials to a second user account on the remote data source,
      wherein the second user account stores health data obtained by the second user fitness device measuring a second property of the user;
   receiving, at the task server, third access credentials to the controlled data source,
      wherein the controlled data source and the task server are controlled by a common entity,
      wherein the third access credentials grant the user access to a third user account storing business data on the controlled data source, and
      wherein the business data comprises data relating to business tasks of the user;
   obtaining, by the task server:
      the fitness data from the first user account using the first access credentials,
      the health data from the second user account using the second access credentials, and
      the business data from the controlled data source using the third access credentials;
   generating, by the task server, a first task based on the fitness data and the health data, and generating a second task based on the business data,
      wherein the first task is for a physical health goal for the user,
      wherein the second task is for a business goal for the user, and
      wherein the user performing the first task reduces a first efficiency of performing the second task, and wherein the user performing the second task reduces a second efficiency of performing the first task;
   analyzing, by the task server, the first task and the second task using predetermined benchmarks;
   integrating, by the task server, the first task and the second task into a plan that includes user activities for both the first task and the second task, the plan further comprising an efficiency determination for accomplishing both the first task and the second task, and
   transmitting the plan to a user device of the user for display to the user.

2. The method of claim 1, wherein the plan comprises results and notifications.

3. The method of claim 2, further comprising:
   presenting the results to the user.

4. The method of claim 3, further comprising:
notifying the user regarding the notifications.

5. The method of claim 2, further comprising:
presenting the results to a business owner, wherein the results are associated with a plurality of employees of the business owner.

6. The method of claim 5, wherein the results comprise metrics describing a combination of a health efficiency and a business efficiency associated with a particular combination of a physical task with a business task regarding the plurality of employees.

7. The method of claim 1, wherein the first user fitness device and the second user fitness device are selected from the group consisting of: a mobile phone, a laptop computer, a desktop computer, a tablet computer, a virtual reality viewer, a smart phone, a smart watch, a smart wristband, smart jewelry, smart eyewear, a smart contact lens, computer display glasses or goggles, and combinations thereof.

8. The method of claim 1, further comprising:
determining a threshold distance;
identifying a location of a mobile device of the user;
determining an entity that aids the user in fulfilling the plan;
identifying a location of the entity within the threshold distance; and
notifying the user regarding the location of the entity.

9. The method of claim 1, wherein the plan comprises:
a first plan providing an optimal improvement in health regarding the user;
a second plan providing an optimal improvement in business efficiency regarding the user; and
a third plan providing an optimal combined improvement in health and business efficiency regarding the user.

10. A system for coordinating communication among devices, comprising:
a data repository comprising:
first access credentials to a first user account storing fitness data obtained by a first user fitness device that is configured to measure a first property of a user, and
second access credentials to a second user account storing health data obtained by a second user fitness device that is configured to measure a second property of the user; and
instructions, which when executed a computer processor cause the computer processor to:
receive the first access credentials to the first user account on a remote data source;
receive the second access credentials to the second user account on the remote data source;
receive third access credentials to the controlled data source,
wherein the controlled data source and the task server are controlled by a common entity,
wherein the third access credentials grant the user access to a third user account storing business data on the controlled data source, and
wherein the business data comprises data relating to business tasks of the user;
generate a first task based on the fitness data and the health data, and generate a second task based on the business data,
wherein the first task is for a physical health goal for the user,
wherein the second task is for a business goal for the user, and
wherein the user performing the first task reduces a first efficiency of performing the second task, and wherein the user performing the second task reduces a second efficiency of performing the first task;
analyze the first task and the second task using a predetermined benchmark in order to integrate the first task and the second task into a plan that includes user activities for both the first task and the second task, the plan further comprising an efficiency determination for accomplishing both the first task and the second task; and
transmit the plan to a user device.

11. The system of claim 10, wherein the instructions further cause the computer processor to:
generate the results; and
present the results to the user.

12. The system of claim 10, wherein the instructions further cause the computer processor to:
generate the notifications; and
notify the user regarding the notifications.

13. The system of claim 10, wherein the instructions further cause the computer processor to:
display the plan to the user.

14. The system of claim 10, wherein the plan comprises results and notifications.

15. The system of claim 14, wherein the instructions further cause the computer processor to:
notify the user regarding the notifications.

16. The system of claim 14, wherein the instructions further cause the computer processor to:
present the results to a business owner, wherein the results are associated with a plurality of employees of the business owner.

17. The system of claim 14, wherein the results comprise metrics describing a combination of the health and the business efficiency regarding the plurality of employees.

18. The system of claim 10, wherein the first user fitness device and the second user fitness device are selected from a group consisting of: a mobile phone, a laptop computer, a desktop computer, a tablet computer, a virtual reality viewer, a smart phone, a smart watch, a smart wristband, smart jewelry, smart eyewear, a smart contact lens, computer display glasses or goggles, and combinations thereof.

19. The system of claim 10, wherein the instructions further cause the computer processor to:
determine a threshold distance;
identify a location of a mobile device of the user;
determine an entity that aids the user in fulfilling the plan;
identify a location of the entity within the threshold distance; and
notify the user regarding the location of the entity.

20. The system of claim 10, wherein the plan comprises:
a first plan providing an optimal improvement in health regarding the user;
a second plan providing an optimal improvement in business efficiency regarding the user; and
a third plan providing an optimal combined improvement in health and business efficiency regarding the user.

21. A non-transitory computer readable medium (CRM) storing instructions for coordinating communication between a remote data source, a first user fitness device, a second user fitness device, a controlled data source, and a task server, the instructions comprising functionality for:
receiving, at the task server, first access credentials to a first user account on the remote data source, wherein the first user account stores fitness data obtained by the first user fitness device measuring a first property of the user;

receiving, at the task server, second access credentials to a second user account on the remote data source,
  wherein the second user account stores health data obtained by the second user fitness device measuring a second property of the user;

receiving, at the task server, third access credentials to the controlled data source,
  wherein the controlled data source and the task server are controlled by a common entity,
  wherein the third access credentials grant the user access to a third user account storing business data on the controlled data source, and
  wherein the business data comprises data relating to business tasks of the user;

obtaining, by the task server:
  the fitness data from the first user account using the first access credentials,
  the health data from the second user account using the second access credentials, and
  the business data from the controlled data source using the third access credentials;

generating, by the task server, a first task based on the fitness data and the health data, and generating a second task based on the business data,
  wherein the first task is for a physical health goal for the user,
  wherein the second task is for a business goal for the user, and
  wherein the user performing the first task reduces a first efficiency of performing the second task, and wherein the user performing the second task reduces a second efficiency of performing the first task;

analyzing, by the task server, the first task and the second task using predetermined benchmarks;

integrating, by the task server, the first task and the second task into a plan that includes user activities for both the first task and the second task, the plan further comprising an efficiency determination for accomplishing both the first task and the second task, and transmitting the plan to a user device of the user for display to the user.

\* \* \* \* \*

UNITED STATES PATENT AND TRADEMARK OFFICE
CERTIFICATE OF CORRECTION

| | |
|---|---|
| PATENT NO. | : 10,504,049 B1 |
| APPLICATION NO. | : 14/812850 |
| DATED | : December 10, 2019 |
| INVENTOR(S) | : Diana Kaaha |

It is certified that error appears in the above-identified patent and that said Letters Patent is hereby corrected as shown below:

On the Title Page

On page 2, under OTHER PUBLICATIONS, occurring in the first reference cited, Line 2, "pronnotion" should read -- promotion --.

Signed and Sealed this
Thirty-first Day of March, 2020

Andrei Iancu
*Director of the United States Patent and Trademark Office*